(12) United States Patent
Szuba

(10) Patent No.: US 6,945,898 B2
(45) Date of Patent: Sep. 20, 2005

(54) DIFFERENTIAL MECHANISM FOR A VEHICLE

(75) Inventor: Joseph Szuba, Dearborn, MI (US)

(73) Assignee: RonJo Company, LLC, Orion, MI (US)

( * ) Notice: Subject to any disclaimer, the term of this patent is extended or adjusted under 35 U.S.C. 154(b) by 25 days.

(21) Appl. No.: 10/729,397

(22) Filed: Dec. 5, 2003

(65) Prior Publication Data

US 2004/0116235 A1 Jun. 17, 2004

Related U.S. Application Data

(60) Provisional application No. 60/431,002, filed on Dec. 5, 2002, and provisional application No. 60/512,001, filed on Oct. 16, 2003.

(51) Int. Cl.$^7$ .............................................. F16H 48/06
(52) U.S. Cl. ...................................................... 475/230
(58) Field of Search ...................... 74/606 R; 475/230, 475/160

(56) References Cited

U.S. PATENT DOCUMENTS

| 4,125,026 A | 11/1978 | Torii et al. ..................... 74/713 |
| 4,455,889 A | 6/1984 | Hauser |
| 5,533,423 A | * 7/1996 | Stehle et al. ............... 74/606 R |
| 5,669,844 A | * 9/1997 | Homan et al. ............... 475/160 |
| 6,015,361 A | 1/2000 | Yamazaki et al. |
| 6,045,479 A | 4/2000 | Victoria et al. ............. 475/230 |
| 6,061,907 A | 5/2000 | Victoria et al. ............ 29/893.1 |
| 6,176,152 B1 | 1/2001 | Victoria et al. ............... 74/607 |
| 6,379,277 B1 | 4/2002 | Victoria et al. ............. 475/231 |
| 6,413,182 B1 | 7/2002 | Yates III et al. |

FOREIGN PATENT DOCUMENTS

| EP | 0 343 146 A2 | 11/1989 |
| EP | 0 903 516 A1 | 3/1999 |
| EP | 0 979 959 A1 | 2/2000 |
| JP | 9-89073 | 3/1997 |

OTHER PUBLICATIONS

PCT/US03/38965 International Search Report, May 5, 2004.

* cited by examiner

Primary Examiner—Dirk Wright
(74) Attorney, Agent, or Firm—Howard & Howard

(57) ABSTRACT

A differential mechanism includes a housing portion having a generally annular wall with a generally annular inner surface. The annular wall defines an open end of the housing portion. The lid is affixed to the open end forming an enclosure with the housing portion. The opposing side bevel gears are in driving engagement with at least one bevel pinion assembly. The bevel pinion assembly includes at least one bevel pinion shaft with opposing axial ends, each supporting a side bevel gear. The bevel pinion assembly and the side bevel gears are disposed within said enclosure. The annular inner surface defines at least two receptors having ingress's, each receptor engaging one axial end of the pinion shaft independently of the lid.

44 Claims, 6 Drawing Sheets

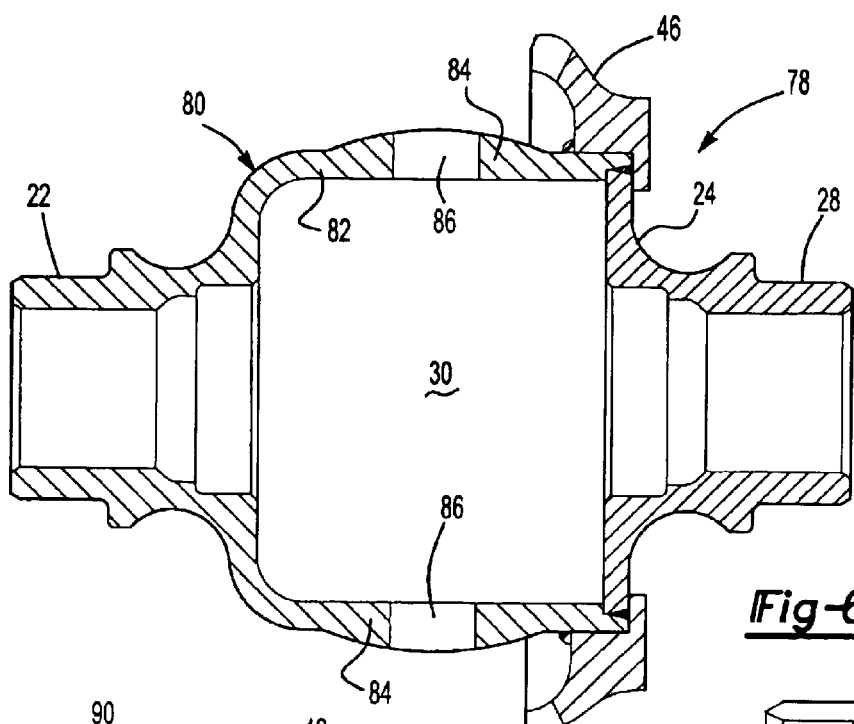
*Fig-6A*
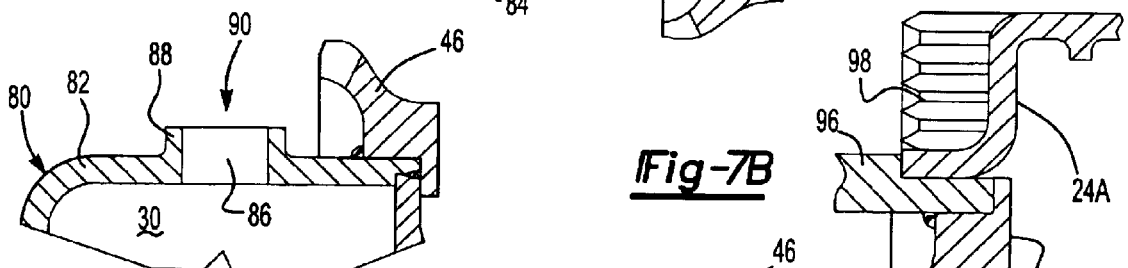
*Fig-6B*  *Fig-7B*
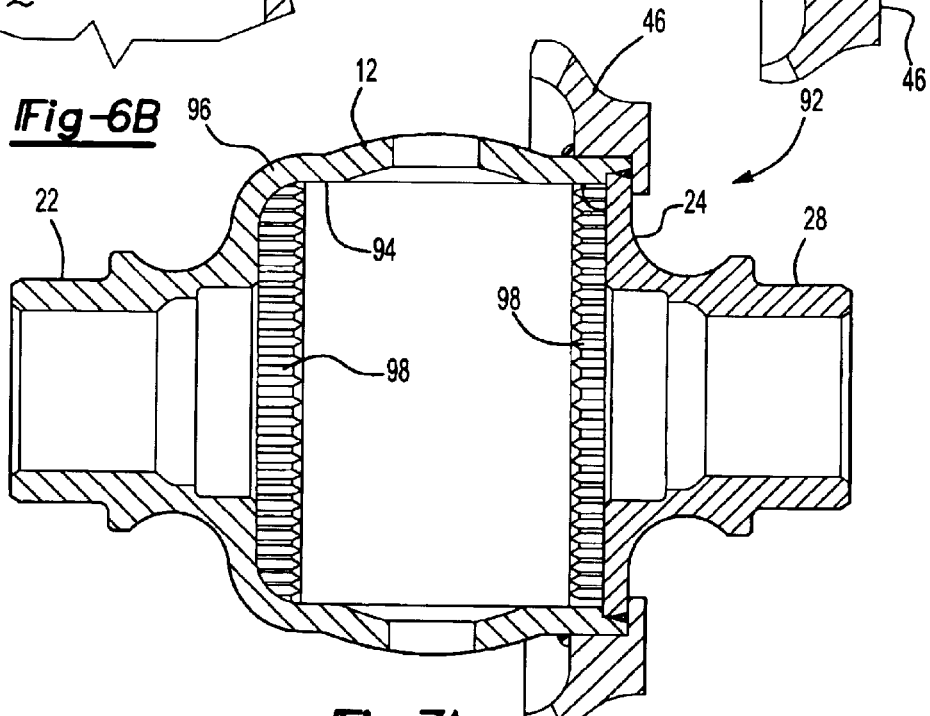
*Fig-7A*

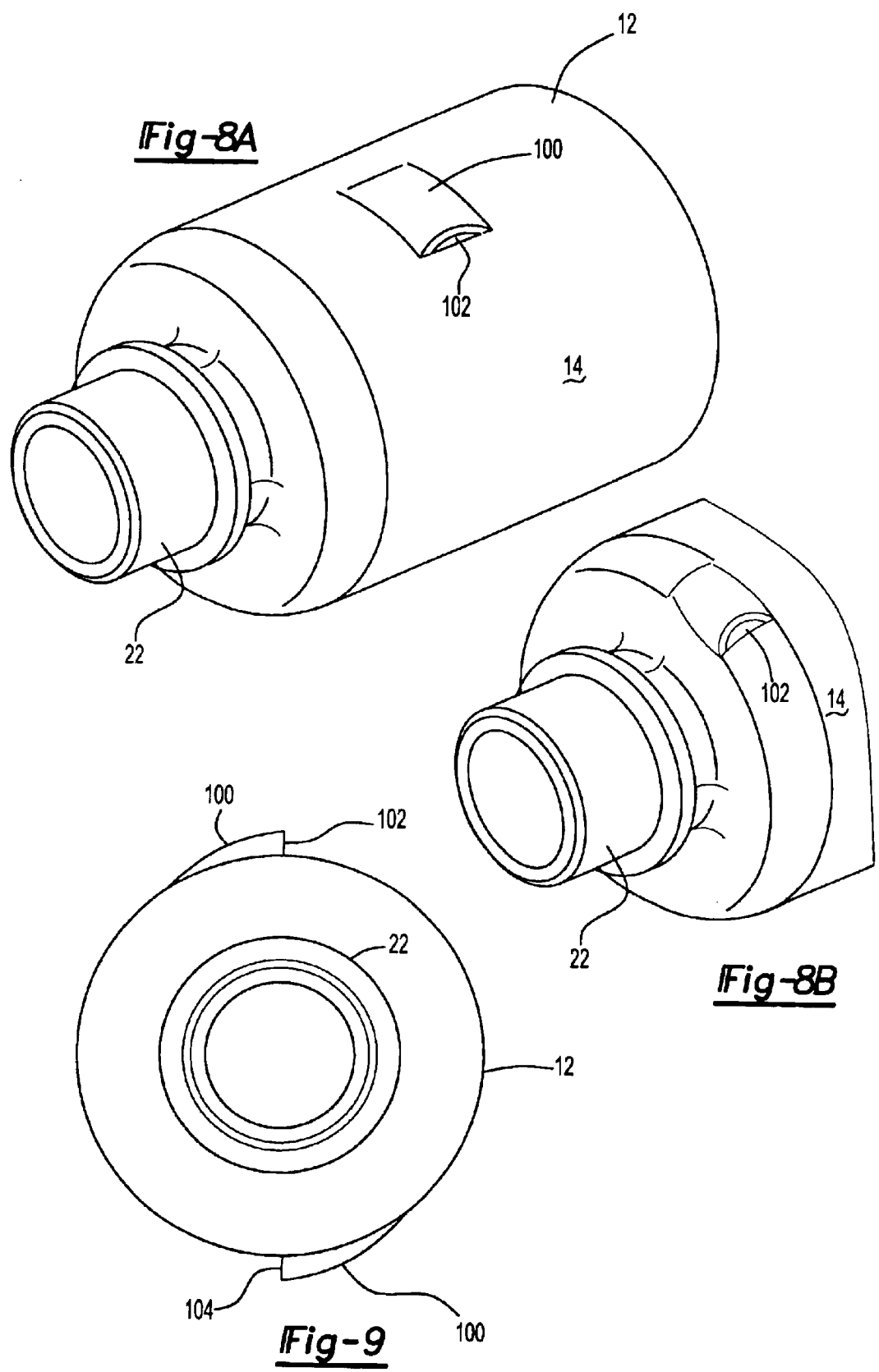

US 6,945,898 B2

DIFFERENTIAL MECHANISM FOR A VEHICLE

This application claims priority to U.S. Provisional Patent Application Nos. 60/431,002 filed Dec. 5, 2002 and 60/512,001 filed Oct. 16, 2003.

FIELD OF THE INVENTION

This invention relates generally to a differential mechanism for use with a vehicle transmission.

BACKGROUND OF THE INVENTION

Differential mechanisms are included in vehicle transmissions to transmit torque from a transmission output to opposing axle shafts allowing right and left wheels to rotate at different speeds, particularly important when negotiating a turn. While performing generally the same function, differential mechanisms have different dimensional requirements for rear wheel and front wheel drive vehicles. Specifically, differentials intended for use on front wheel drive vehicles require a beveled, and even annular shape in order to compensate for both the smaller packaging area available and to account for the steering characteristics of the front wheels of the vehicle. Rear wheel drive vehicles are typically larger and require more torque production than front wheel drive vehicles and include sport utility, pick-ups, and even heavy duty vehicles. Therefore, the rear wheel drive differential is typically dimensioned larger with heavier gauge steel than is a front wheel drive differential. Iron castings presently used to form the housing of a differential for a rear wheel drive vehicle requires a large number of machining operations to produce finished parts having the dimensions necessary to provide adequate tolerances to support the gears disposed within the housing. Dimensional accuracy is important to produce a vibration free motion of the differential in order to produce a smooth vehicle operation.

Given the high torque requirements that is typical of the rear wheel drive vehicle, it is believed that the differential housing should include a more dimensionally stable and durable configuration than what is required of a front wheel drive differential housing. Furthermore, many of the manufacturing drawbacks of cast differential housings have resulted in excessive cost of a typical vehicle transmission. U.S. Pat. Nos. 6,045,479, 6,061,907, 6,176,152, and 6,379,277 each disclose a method of forming a differential housing using a cold flow-forming process. While the housing formed by the process disclosed in these prior references are believed to be effective for use in a front wheel drive transmission, it is believed that the housings will not be as effective for use in a rear wheel drive vehicle. However, the dimensional improvements produced by the cold flow-forming process that enable sheet steel to be used to form the differential housing can also be used to form a differential housing for a rear wheel drive differential. Therefore, the cold flow-forming process disclosed in these prior art patents are included by reference herein.

Furthermore, improvements made to the cold, flow forming process and performance deficiencies of the prior art patents would also be desirable. For example, the prior art housings have not proven to withstand required durability testing due to the location of the shaft holding the pinion gears inside the housing. Specifically, sandwiching the shaft between two housing portions does not provide the durability required of a rear wheel drive differential.

SUMMARY OF THE INVENTION

A differential mechanism includes a housing portion having a generally annular wall with a generally annular inner surface. The generally annular wall defines an open end of the housing portion. A lid is affixed to the open end forming an enclosure with the housing portion. Opposing side bevel gears are in driving engagement with at least one bevel pinion assembly, each being disposed within the enclosure. A bevel pinion shaft includes opposing axial ends, each of which supports a side bevel gear. The annular inner surface defines at least two receptors each rotatably engaging one axial end of the pinion shaft independent of and at spaced locations from the lid. The inner surface defines an ingress for each receptor for facilitate inserting the axial end of the shaft into the housing.

The inventive configuration of the annular inner surface of the housing portion provides benefits not heretofore provided by prior art differential housings. Unlike differential housings formed from castings, the side bevel gears and the bevel pinion assembly can be inserted mechanically and do not require manipulation into openings typically disposed in cast differential housings. In fact, unlike cast differential housings, each bevel pinion assembly is pre-assembled prior to insertion into the differential housing. Still further, because the housing portion of the differential housing includes an annular wall, more than one bevel pinion assembly can be included in the differential mechanism, which can provide benefits such as, for example, increased torque. It is believed, that by adding two bevel pinion assemblies for a total of four pinion gears, the torque produced by a typical transmission is increased by 75%. A total of three bevel pinions is believed to increase the torque by around 40%. Still further, a housing portion having a generally annular wall is significantly stronger than a housing produced by a casting process, which includes large openings in order to insert each of the gears disposed within the housing. Therefore, the inventive differential mechanism includes a housing portion that is significantly stronger than a cast housing portion enabling a reduction in the gauge of steel used to form the differential housing reducing the mass of the differential housing by up to 10 pounds.

Furthermore, spacing the assembly from the lid provides increased strength and housing durability over prior art devices because the assembly is spaced from the open end of the housing, unlike the prior art devices, which sandwich the assembly between two halves of the housing.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a further embodiment of the inventive differential housing showing an alternative lid with a planetary gear;

FIGS. 6a and 6b are sectional views of alternative embodiments of the inventive differential housing showing localized, increased wall thickness;

FIGS. 7A and 7B are a side, sectional views of an alternate embodiment of the differential housing having a splined inner surface on the housing and the lid;

FIGS. 8A and 8B show a partial perspective view of the inventive differential housing showing a scoop; and FIG. 9 shows a top view of the differential housing showing the scoops.

DETAILED DESCRIPTION OF THE INVENTION

Figure 1:
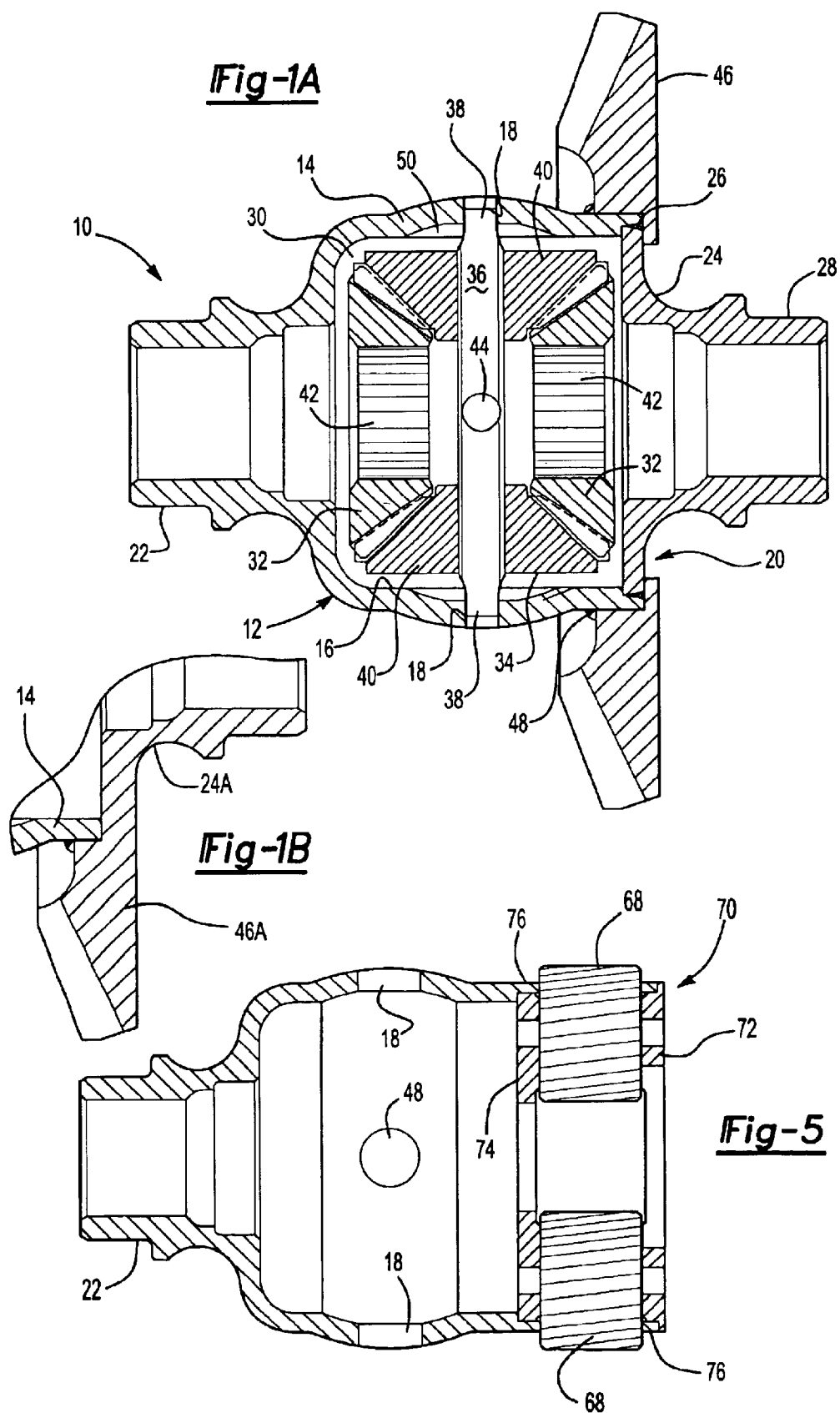
FIGS. 1A and 1B is a side sectional view of the inventive differential housing of the present application.

Referring to FIG. 1, a differential assembly of the present invention is generally shown at 10. A differential housing 12 includes a generally annual wall 14 that defines a generally annular inner surface 16. The inner surface 16 defines at least two receptors 18, and more preferably at least four receptors 18, the purpose of which will be explained further below. The annular wall 14 of the differential housing 12 defines an open end 20. The differential housing 12 defines a journal 22 at an opposite end of the housing 12 from the open end 20. The journal 22 may be formed apart from the housing 12 and then welded to the housing assembly, or may be formed integrally with the housing 12.

The housing 12 is formed by a spin-forming or flow-forming cold working operation that is particularly suited to produce bowl-shaped parts, and more particularly suited to form rotatably symmetrical parts. The housing 12 is formed over a chuck (not shown) by spinning rollers (not shown) that are profiled. The spin forming is an operation in which the material is plasticized by a combination of compression and tension forces applied to a workpiece by rollers. Flow-forming is an operation in which deformation is the result of compression force applied by the rollers to the housing. Preferably, the housing 12 is pre-stamped from a heavy gauge steel and includes a general configuration of the chuck, however, the housing 12 may be formed from a flat panel if necessary. With either process, precise dimensional tolerances can be maintained on the inner surface of a workpiece in which a net shape is produced with the additional step of machining the inner surface as is required of a cast housing. A near net forged or cast preform may also be used and the net shapes formed over the chuck in the same manner a detailed above.

During the forming operation, the housing 12 is plasticized which minimizes spring back and allows a high level of dimensional accuracy. The outer contour of the chuck is imprinted very precisely into the inner surface of the housing 12. The outer surface of the housing 12 is only free-formed by spinning rollers. Therefore, the outer surface may have a wavy shape, which does not adversely affect the operation of the differential assembly 10.

In the case of spin-forming in general there is no deliberate change in the wall thickness during the forming process. The starting workpiece is a sheet metal disc. Preferably, the sheet metal disc is not entirely bake-hardened in order to facilitate the formation of the housing 12. However, it may be desirable to bake-harden the surface of the sheet metal while not bake-hardening the inner thickness of the sheet metal.

In the case of flow-forming, there is a deliberate change in the wall thickness of the housing 12 to that of the preformed part. Locally increasing the wall thickness is helpful toward strengthening and stiffening the housing 12 as required by its operational loading and material properties as will be explained further below. The starting housing stamping is typically a tube or cup, which is parallel sided or tapered. The preformed part is clamped against a spinning chuck, which is driven by a spindle. One or more spinning rollers apply radial force into the surface of the preform until the inner surfaces of the workpiece conforms to the external surfaces of the spinning chuck and acquires the required shape and dimensions. The process is known to produce excellent internal dimensional accuracy and internal surface finish while still being able to create integrated profiles and features such as, for example, the receptors 18. The rollers force the sheet metal inwardly toward the chuck, which includes projections that match the preferred dimension of the receptors thereby forming the receptors in the annular wall 14 of the differential housing 12. A chuck having collapsing inserts to form, for example, the receptors 18, is required to meet various design characteristics that protrude during the forming operation and retract into the chuck to remove the housing 12 from the chuck.

A lid 24, preferably formed as a stamping by a die press, is affixed to the open end 20 of the differential housing 12 via a laser weld bead 26. A welding laser follows a seam formed between the differential housing 12 and the lid 24 to secure the lid 24 to the differential housing 12.

The lid 24 includes a lid journal 28 defining a common axis with an axis defined by the housing journal 22, the purpose of which will be more evident when described further below. Each journal 22, 28 is sized to receive a splined shaft (not shown) that transfers motion to the vehicle wheels (not shown).

The differential housing 12 and the lid 24 define an enclosure 30 in which opposing side bevel gears 32 are disposed. The side bevel gears 32 are in driving engagement with at least one bevel pinion assembly 34. Each bevel pinion assembly includes a bevel pinion shaft 36 having opposing axial ends 38. A pinion gear 40 is disposed near each opposing axial end 38 on the bevel pinion shaft 36. Each opposing axial end 38 is pivotally received by a receptor 18 thereby allowing the pinion gears 40 to pivot upon an axis defined by the opposing receptors 18. Each axial end 38 of the pinion shaft 36 is received by a receptor 18 in a locking engagement so that the shaft 36 does not pivot relative to the receptors 18 thereby ensuring that the pinion gears 40 rotate upon the shaft 36. For example, the axial end is formed to define flat surfaces that about cooperative flat surfaces defined by the receptors 18. Alternatively, the axial ends 38 are welded to the receptors 18 to prevent shaft 36 rotation.

Each side bevel gear 32 includes splines 42 to receive the splined shaft and have a common axis with the housing journal 22 and the lid journal 28. The bevel pinion assembly 34 and the side bevel gears 32 are in driving engagement as is known to those of skill in the art of vehicle transmissions. A second shaft 44 is optionally inserted through, or otherwise affixed to, a bevel pinion shaft in order to include a second bevel pinion assembly 34 in the enclosure 30. The second shaft 44 rotates relative to the first shaft 36. It is believed that the addition of a second bevel pinion assembly 34 providing a total of four pinion gears 40 will produce 75% more torque than what is available with a single bevel pinion assembly 34. Additionally, providing a total of three pinion gears are believed to produce 40% additional torque. Cast differential housings presently available do not provide the ability to include a second bevel pinion shaft due to the large opening in the annular wall required to insert the single bevel pinion assembly. The second bevel pinion assembly is not shown in FIG. 1 in order to provide clarity to the inventive concepts.

A ring gear 46 is affixed to the open end 20 of the differential housing 12. The ring gear 46 is preferably attached to the differential housing 12 by laser-welding, which produces a ring gear laser weld bead 48 at the seam formed between the differential housing 12 and the ring gear 46. Preferably, the ring gear 46 overlays the laser weld beam 26 formed at the seam between the lid 24 and the open end 20 of the differential housing 12. Alternatively, as shown in FIG. 1a, a ring gear 46a is formed integrally with the lid 24a to eliminate the step of welding the ring gear 24a to the housing 12.

Figure 2:
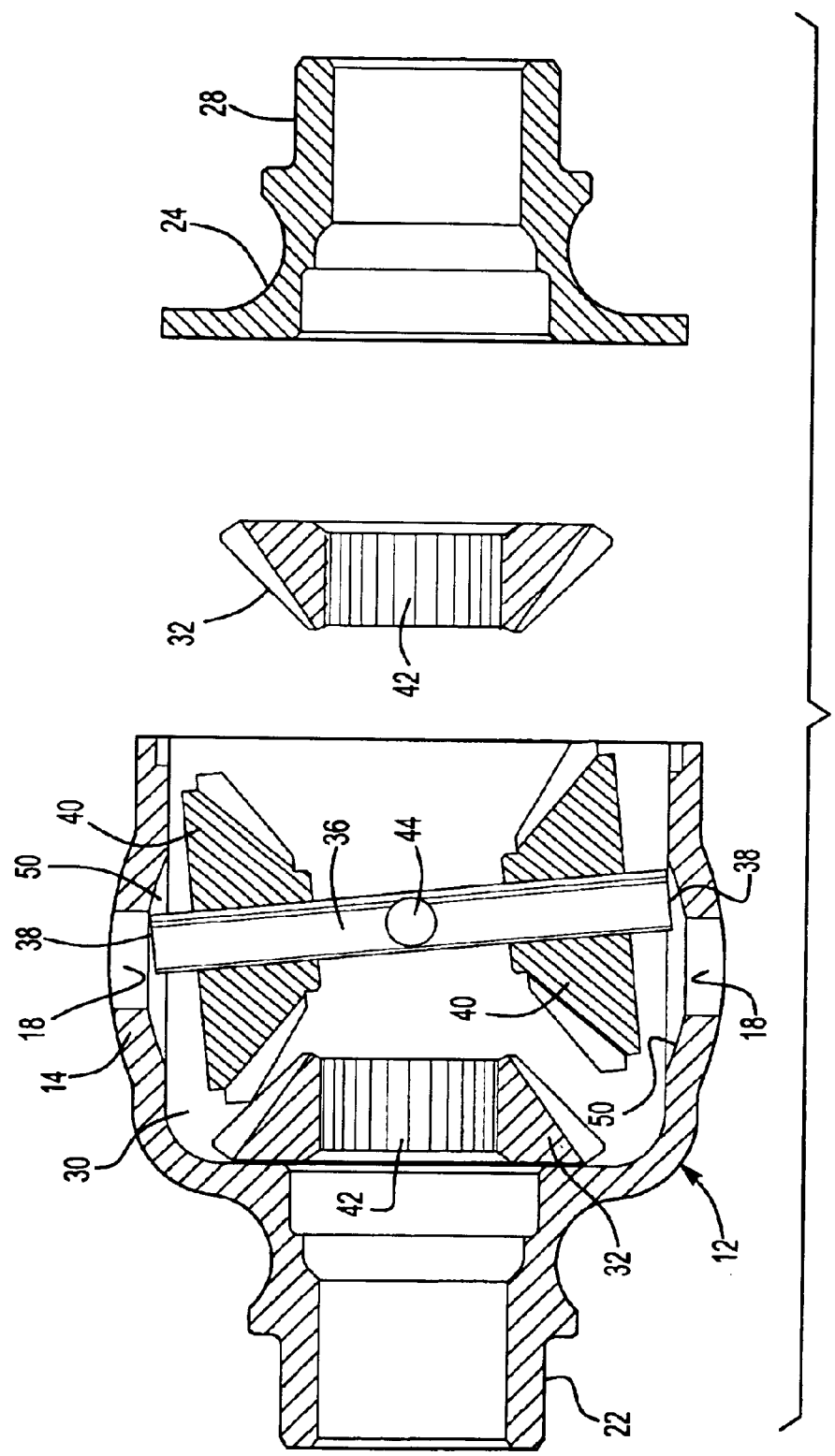
FIG. 2 is an exploded view of the inventive differential housing showing the bevel pinion assembly being inserted.

FIG. 2 shows an exploded view of the inventive differential assembly 10 during the assembly process. In order to align the bevel pinion shaft 36 so that the opposing axial ends 38 are pivotally retained in the receptors 18, each receptor 18 includes a beveled edge 50 providing an ingress to the receptors 18 and allowing for the angled insertion of the bevel pinion assembly 34 into the differential housing 12. It is believed that the angle of ingress of the bevel edge 50 would need to be adjusted for the installation of a bevel pinion assembly 34 having four or more pinion gears 40. During the assembly process, a first side bevel gear 32 is inserted into the differential housing 12 aligning the splines 42 with the housing journal 22. Once the side bevel gear 32 is in place, the bevel pinion assembly 34 is inserted so that the bevel pinion shaft 36 is pivotally retained by the receptors 18 as stated above. After the bevel pinion assembly 34 is inserted into the differential housing 12, the second side bevel gear 32 is inserted into the differential housing 12 in driving engagement with the pinion gears 40. Once all the gears 32, 40 are in place, the lid 24 is placed over the open end 20 of the differential housing 12. The seam formed between the differential housing 12 and the lid 24 is preferably laser-welded securing the lid 24 to the differential housing 12 so that the lid journal 28 is axially aligned with the spines 42. Other methods of securing the lid 24 to the housing 12 may also be used.

Figure 3:
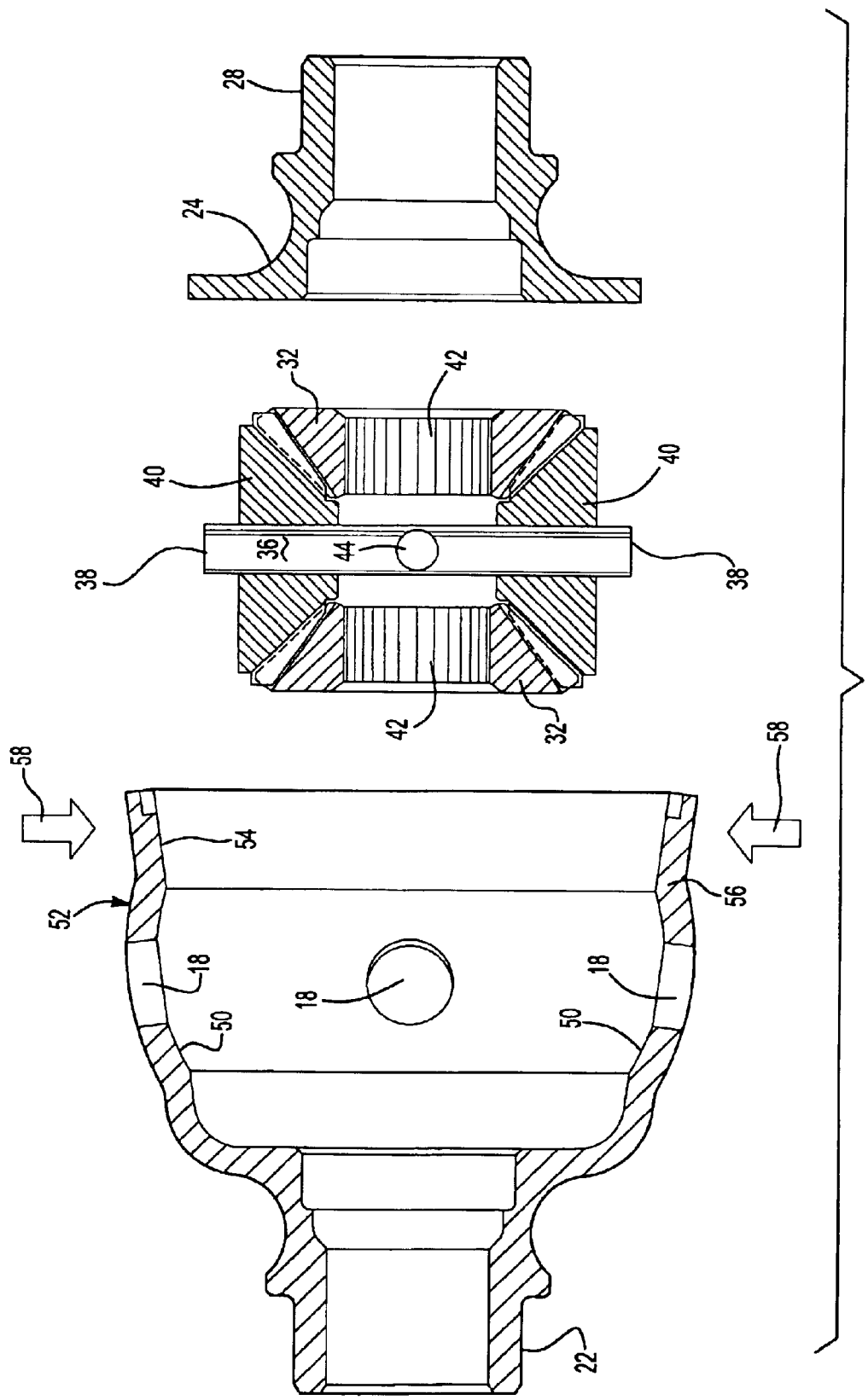
FIG. 3 is an exploded view of an alternative embodiment of the inventive differential housing.

FIG. 3 shows an alternative embodiment of the differential housing 52 and the method of assembly. The method of assembly represented in FIG. 3 is preferred when four or more pinion gears 40 are included in the assembly 10. The alternate differential housing 52 includes an inner surface 54 of an annular wall 56 having a diameter that is generally as wide as the bevel pinion shaft 36. The alternate inner surface 54 may include a bevel edge 50 providing an ingress to the receptors 18. However, it should be understood by those of skill in the art of vehicle transmissions that the diameter of the alternate inner surface 54 can be optimized so that a bevel edge 50 would not be required. Once the gears 32, 40 are positioned in the differential housing 12, the lid 24 is positioned over the open end 20 of the differential housing 12. A subsequent rolling process in the direction of arrows 58 reforms the open end 20 of the differential housing 12 thereby reducing the diameter of the alternate inner surface 54. Subsequently, the seam formed between the lid 24 and the differential housing 52 is laser-welded thereby securing the lid 24 to the alternate differential housing 52. The final dimensions of the alternate differential housing 52, after the additional rolling step, is identical to the first embodiment of the differential housing 12.

Figure 4:
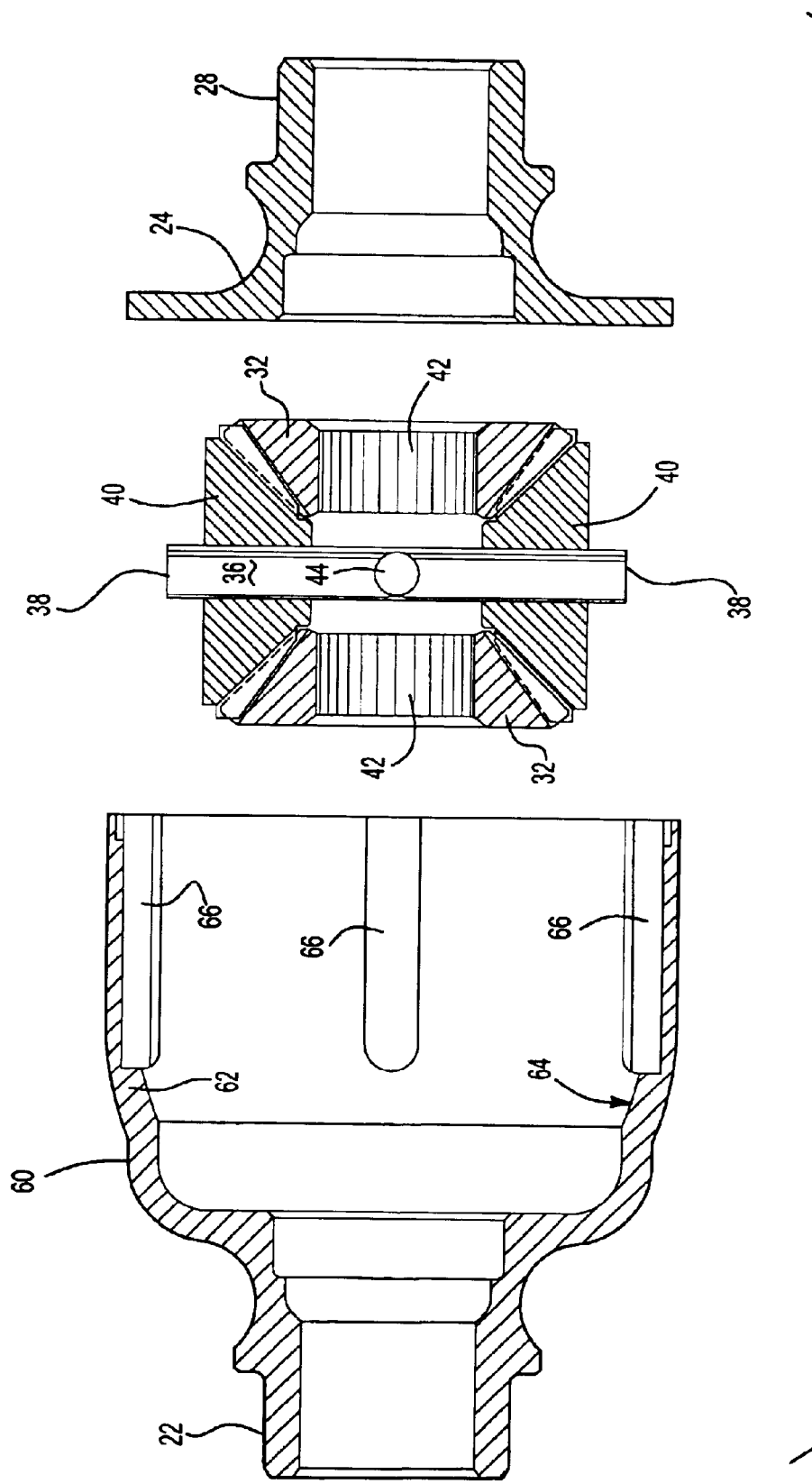
FIG. 4 is a further alternate embodiment of the inventive differential housing.

A further alternate embodiment of a differential housing 60 is shown in FIG. 4. An alternate annular wall 62 includes an alternate inner surface 64. At least two receptor slots 66 provide an ingress for the opposing axial ends 38 of the bevel pinion shaft 36 during assembly. The tension transferred to the side bevel gears 32 from the shafts engaging the splines 42 holds the bevel pinion assembly 34 in a fixed location once the assembly of the differential assembly 10 is complete. The slots 66 are preferable when a bevel pinion assembly 34 having at least four pinion gears 40 is included. As stated above, once all the gears 32, 40 are in place, the lid 24 is positioned over the open end 20 of the differential housing 12 and the seam formed between the differential housing 12 and the lid 24 is laser-welded securing the lid 24 to the differential housing 12. As stated above, once the lid 24 is laser-welded to the open end 20 of the differential housing 12, the ring gear 46 is laser-welded to the differential housing 12 over the lid 28 as shown in FIG. 1.

FIG. 5 shows a further alternate embodiment of the inventive differential assembly 10 where the ring gear 46 has been replaced by planetary carriers 68. The planetary carriers 68 are desirable in more sophisticated transmission assemblies preferred on luxury vehicles due to the smoother transition between gears that is produced by the planetary carriers 68. FIG. 5 shows a planetary gear assembly 70 having an outer end plate 72 and an inner end plate 74 mated with opposing side plates 76 to support planetary gears 68. Each of the plates 72, 74, 76 are preferably laser-welded together and the assembly 70 is laser-welded to the differential housing 12 during the assembly process. Different plate configurations can be used as desired to support the planetary gears 68 upon the differential housing 12 as may be required by operational or dimensional requirements.

Referring now to FIG. 6A, a still further embodiment of the inventive differential assembly is generally shown at 78. In this embodiment, a differential housing 80 defines an annular wall 82 into which a protuberance 84 is locally formed. Preferably, the protuberance 84 takes the form of an annular bead that encircles the entirety of the annular wall 82. The protuberance 84 increases the thickness of the annular wall 82 at the location of each receptor 86. The increased wall thickness at each receptor 86 increases the strength of the generally annular wall 84 improving the durability of the housing 80 during operation of a motor vehicle. It should be understood that the protuberance 84 may also be locally formed proximate each receptor 86 as desired.

FIG. 6B shows still a further embodiment where a flange 88 is formed around each receptor 86 on an outside surface of the generally annular wall 82. The flange 88 also improves the durability of the housing 80 during operation of the motor vehicle. The flange 88 may define an opening 90 into the receptor 86 and therefore into the enclosure 30 of the housing 80. The flange 88 may be formed during the cold forming process or during a subsequent manufacturing operation performed on the housing 80.

A still further embodiment of the invention as generally shown at 92 in FIG. 7A. In this embodiment, a spline portion 98 is formed in the inner surface 94 of the generally annular wall 96. The spline portion 98 is adapted to receive clutch plates (not shown) known to those of skill in the art to provide enhanced gear shifting properties to the transmission. The splines 98 are formed from the chuck during the cold forming process described above. The splines 98 and the clutch plates provide a clutch activated gear shift that enhances the shifting properties of the transmission. It is desirable to form a second set of splines 99 in the inner surface 94 of the annular wall 96 at an opposite end of the housing 12 as shown in FIG. 7A. Alternatively, the second set of splines 99 are formed in the lid 28, which is received by the housing 12 as is shown in FIG. 7B.

As is known to those of skill in the art, lubricant flows throughout a transmission to facilitate the operation of the transmission gears. It is desirable to provide a free flow of the transmission fluid inside the differential housing 12. As shown in FIGS. 8 and 9A, an inlet scoop 100 is disposed in an outer wall 102 of the differential housing 12. Preferably, the annular wall 14 is pierced and the scoop is formed by forcing the annular wall 14 outwardly at the location of the pierce forming an first opening 102 in the generally annular wall 14. Preferably, the first opening 102 faces in the direction of the rotating housing 12 so that transmission fluid is forced into the enclosure 30 during operation of the vehicle. A second scoop opening 104 is formed on an opposite side of the housing 12 of the first scoop opening 102 to provide additional lubricant to continuously flow through the enclosure 30 during operation of the motor vehicle. Preferably, the scoop openings 100, 104 are spaced between the receptors 18, 86 best seen in FIGS. 1 through 7. Alternatively, the scoops 100 are located proximate the splines 98 on the inner surface 16 of the housing 12 as shown in FIG. 9B. The lubricant entering the enclosure 30 through scoop openings exits through at least one of the journals 22, 28 providing additional lubrication to the shafts extending into the enclosure 30 through the journals 22, 28.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A differential assembly comprising:
    a housing portion having a generally annular wall with a generally annular inner surface, said generally annular wall defining an open end of said housing portion;
    a lid fixedly attached to said open end forming an enclosure with said housing portion;
    opposing side bevel gears in driving engagement with at least one bevel pinion assembly having at least one bevel pinion shaft with opposing axial ends each supporting a side bevel gear, said bevel pinion assembly and said side bevel gears being disposed within said enclosure; and
    said annular inner surface defining at least two receptors each engaging one axial end of said pinion shaft at spaced locations from said lid, wherein said inner surface defines an ingress for each receptor for inserting said axial end of said pinion shaft.

2. An assembly as set forth in claim 1, wherein said ingress comprises a beveled edge for inserting said axial end of said pinion shaft into said receptor.

3. An assembly as set forth in claim 1, wherein said ingress defines a slot extending inwardly from said open end for inserting said axial end of said pinion shaft into said receptor.

4. An assembly as set forth in claim 1, wherein each of said receptors define a flange extending outwardly from said generally annular wall and encircling said receptors.

5. An assembly as set forth in claim 4, wherein said flange defines an opening through said generally annular wall.

6. An assembly as set forth in claim 1, wherein said generally annular wall includes a first thickness and a second thickness greater than said first thickness, said receptors being disposed in said generally annular wall proximate said second thickness.

7. An assembly as set forth in claim 6, wherein said housing portion includes a protuberance encircling said generally annular wall defining said second thickness and said receptors being disposed in said protuberance.

8. An assembly as set forth in claim 1, wherein said generally annular inner surface defines a splined portion.

9. An assembly as set forth in claim 1, wherein said pinion shaft includes a length and said inner surface of said annular wall includes a diameter greater than said length of said pinion shaft enabling said axial ends of said pinion shaft to be inserted into said receptors.

10. An assembly as set forth in claim 1, wherein said lid defines a lid splined shaft opening and said housing portion defines a housing splined shaft opening, said splined shaft openings having a common axis.

11. An assembly as set forth in claim 1, wherein said lid defines a seam with said housing portion, said seam being sealed with a laser weld bead.

12. An assembly as set forth in claim 1, further including at least two bevel pinion assemblies each being in driving engagement with said side bevel gears.

13. An assembly as set forth in claim 1, wherein said generally annular wall includes a scoop for funneling fluid into said enclosure.

14. An assembly as set forth in claim 13, wherein said generally annular wall includes an outlet for evacuating fluid from said enclosure.

15. A method of making a differential mechanism comprising the steps of:
    providing a housing preform having an inner surface and at least one open end;
    placing said housing preform over a spinning chuck having a plurality of projections;
    cold-working said housing preform by at least one of spin-forming and flow-forming an inner surface of said housing preform over said chuck and a plurality of projections disposed in said chuck thereby forming receptors into said inner surface of said housing at locations spaced from said open end;
    providing a lid having cooperable dimensions with said open end of said housing preform;
    providing a differential gear assembly having a plurality of spline gears supported by at least one spline shaft;
    inserting said differential gear assembly into said housing, wherein said at least one spline shaft is radially supported by said receptors independent of said lid; and
    securing said lid to said open end of said housing at location spaced from said receptors thereby enclosing said differential gear assembly.

16. The method as set forth in claim 15, further including the step of forming said lid with a die press.

17. The method as set forth in claim 15, wherein said step of securing said lid to said die press is further defined by laser welding said lid to said housing.

18. The method as set forth in claim 17, wherein said step of laser welding said lid to said housing is further defined by laser welding a seam defined between said lid and said housing.

19. The method as set forth in claim 18, further including the step of providing a ring gear.

20. The method as set forth in claim 19, further including the step of securing said ring gear to said housing in an overlapping relationship with said seam defined between said lid and said housing.

21. The method as set forth in claim 19, further including the step of securing said ring gear to said housing by laser welding said ring gear to said housing.

22. The method as set forth in claim 15, further including the step of deforming said housing inwardly thereby securing said differential gear assembly in said housing.

23. The method as set forth in claim 15, further including the step of forming an ingress in said inner surface of said housing for inserting said differential gear assembly.

24. The method as set forth in claim 15, further including the step of forming a bead around said housing increasing a thickness of said housing proximate said receptors.

25. The method as set forth in claim 15, further including the step of forming a flange around said receptors.

26. The method as set forth in claim 15, further including the step of forming splines in said inner surface of said housing.

27. A differential assembly for a transmission having lubricant flowing therethrough, comprising:
  a housing portion having a generally annular wall defining an open end of said housing portion;
  a lid fixedly attached to said open end of said housing portion defining an enclosure with said housing portion;
  a gear assembly disposed within said enclosure, wherein said gear assembly includes opposing side gears in driving engagement with at least one bevel pinion assembly having a shaft received by receptors disposed in said generally annular wall; and
  a scoop formed in said generally annular wall providing an inlet for the lubricant flowing throughout the transmission to enter the housing portion thereby lubricating the gear assembly disposed within the housing portion.

28. An assembly as defined in claim 27, wherein sail scoop opens opposite a direction of rotation of said differential inside the transmission.

29. An assembly as defined in claim 28, including an outlet providing an exit for transmission fluid entering said enclosure through said scoop.

30. An assembly as defined in claim 29, wherein said outlet opens in a same direction of rotation of said differential inside the transmission.

31. An assembly as defined in claim 27, wherein said scoop and said outlet are spaced between said receptors.

32. A differential assembly comprising:
  a housing portion having a generally annular wall with a generally annular inner surface, said generally annular wall defining an open end of said housing portion;
  a lid fixedly attached to said open end forming an enclosure with said housing portion;
  opposing side bevel gears in driving engagement with at least one bevel pinion assembly having at least one bevel pinion shaft with opposing axial ends each supporting a side bevel gear, said bevel pinion assembly and said side bevel gears being disposed within said enclosure; and
  said annular inner surface defining at least two receptors each engaging one axial end of said pinion shaft at spaced locations from said lid, wherein said inner surface defines a slot providing an ingress for each receptor for inserting said axial end of said pinion shaft.

33. An assembly as set forth in claim 32, wherein said slot extends inwardly from said open end for inserting said axial end of said pinion shaft into said receptor.

34. An assembly as set forth in claim 32, wherein each of said receptors define a flange extending outwardly from said generally annular wall and encircling said receptors.

35. An assembly as set forth in claim 32, wherein said flange defines an opening through said generally annular wall.

36. An assembly as set forth in claim 35, wherein said generally annular wall includes a first thickness and a second thickness greater than said first thickness, said receptors being disposed in said generally annular wall proximate said second thickness.

37. An assembly as set forth in claim 36, wherein said housing portion includes a protuberance encircling said generally annular wall defining said second thickness and said receptors being disposed in said protuberance.

38. An assembly as set forth in claim 32, wherein said generally annular inner surface defines a splined portion.

39. An assembly as set forth in claim 32, wherein said pinion shaft includes a length and said inner surface of said annular wall includes a diameter greater than said length of said pinion shaft enabling said axial ends of said pinion shaft to be inserted into said receptors.

40. An assembly as set forth in claim 32, wherein said lid defines a lid splined shaft opening and said housing portion defines a housing splined shaft opening, said splined shaft openings having a common axis.

41. An assembly as set forth in claim 32, wherein said lid defines a seam with said housing portion, said seam being sealed with a laser weld bead.

42. An assembly as set forth in claim 32, further including at least two bevel pinion assemblies each being in driving engagement with said side bevel gears.

43. An assembly as set forth in claim 32, wherein said generally annular wall includes a scoop for funneling fluid into said enclosure.

44. An assembly as set forth in claim 43, wherein said generally annular wall includes an outlet for evacuating fluid from said enclosure.

* * * * *

UNITED STATES PATENT AND TRADEMARK OFFICE
CERTIFICATE OF CORRECTION

PATENT NO. : 6,945,898 B2 Page 1 of 1
DATED : September 20, 2005
INVENTOR(S) : Joseph Szuba It is certified that error appears in the above-identified patent and that said Letters Patent is hereby corrected as shown below:

Column 9,
Line 29, delete "sail" and insert -- said --.

Signed and Sealed this

Tenth Day of January, 2006

JON W. DUDAS
*Director of the United States Patent and Trademark Office*